United States Patent
Pande et al.

(10) Patent No.: US 11,393,371 B2
(45) Date of Patent: Jul. 19, 2022

(54) SYSTEMS AND METHODS FOR MONITORING LIGHT EMISSIONS OF ELECTRONIC DEVICES

(71) Applicant: Rovi Guides, Inc., San Jose, CA (US)

(72) Inventors: Siddhartha Pande, Bengaluru (IN); Madhusudhan Srinivasan, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/349,044

(22) Filed: Jun. 16, 2021

(65) Prior Publication Data
US 2021/0312844 A1 Oct. 7, 2021

Related U.S. Application Data

(63) Continuation of application No. 17/018,961, filed on Sep. 11, 2020, now Pat. No. 11,074,840, which is a continuation of application No. 16/557,915, filed on Aug. 30, 2019, now Pat. No. 10,803,778.

(51) Int. Cl.
*G09G 3/00* (2006.01)
*H05B 47/105* (2020.01)

(52) U.S. Cl.
CPC .......... *G09G 3/006* (2013.01); *H05B 47/105* (2020.01); *G09G 2310/08* (2013.01); *G09G 2320/0233* (2013.01); *G09G 2320/062* (2013.01); *G09G 2320/0653* (2013.01)

(58) Field of Classification Search
CPC .............. G09G 3/006; G09G 2310/08; G09G 2320/0233; G09G 2320/062; G09G 2320/0653; H05B 47/105
See application file for complete search history.

(56) References Cited

U.S. PATENT DOCUMENTS

| | | | |
|---|---|---|---|
| 9,953,615 B2* | 4/2018 | Kwon | G06F 3/0346 |
| 2014/0111558 A1* | 4/2014 | Ishitani | G09G 5/10 |
| | | | 345/690 |
| 2015/0243052 A1* | 8/2015 | Park | G06F 3/04845 |
| | | | 345/589 |
| 2015/0348468 A1* | 12/2015 | Chen | G09G 3/3413 |
| | | | 345/207 |
| 2016/0293139 A1* | 10/2016 | Kwon | G09G 5/06 |
| 2017/0318227 A1* | 11/2017 | Hsu | H04N 5/23219 |
| 2019/0350066 A1* | 11/2019 | Herf | H05B 47/105 |
| 2020/0053312 A1* | 2/2020 | Mukherjee | H04N 21/42201 |

FOREIGN PATENT DOCUMENTS

CN 107741651 A * 2/2018

* cited by examiner

*Primary Examiner* — Michael Pervan
(74) *Attorney, Agent, or Firm* — Haley Guiliano LLP

(57) ABSTRACT

Systems and methods are disclosed herein for monitoring light emissions in electronic devices. The disclosed techniques herein provide for determining a display duration of display devices for a user. Light emission profiles for each of the display devices are determined. A cumulative emissions exposure is determined that is based on the light emission profiles for the display devices and the display duration of the display devices for the user. A determination is made whether the cumulative emissions exposure exceeds a light emission exposure limit set for the user. In a positive determination, an instruction is transmitted to the display devices for execution of a remedial action based on predefined rules.

18 Claims, 6 Drawing Sheets ically in emission exposure limit set for the user is retrieved from a medical database.

SYSTEMS AND METHODS FOR MONITORING LIGHT EMISSIONS OF ELECTRONIC DEVICES

CROSS-REFERENCE TO RELATED APPLICATIONS

This application is a continuation of U.S. patent application Ser. No. 17/018,961, filed Sep. 11, 2020 (now allowed), which is a continuation of U.S. patent application Ser. No. 16/557,915 (now U.S. Pat. No. 10,803,778), filed on Aug. 30, 2019. The disclosures of each application are hereby incorporated by reference herein in their entireties.

BACKGROUND

The present disclosure is directed to techniques for monitoring light emissions in electronic devices.

SUMMARY

Electronic display devices, in an abundancy of form factors, are used to consume content. For example, some display devices may include large screen televisions, personal computer monitors, smartphone screens, and wearable devices (e.g., smartwatches). Extended use of these display devices causes eye strain based on the emission exposure of the display device to the eye. The light emission levels vary with the display device, as each device has its own light emission profile. It remains technically challenging to provide for a monitoring solution for light emission levels that considers the plurality of display devices and varied content types that a user consumes.

Accordingly, techniques are disclosed herein for monitoring light emissions in electronic devices. The disclosed techniques herein provide for determining a display duration of display devices for a user. Light emission profiles for each of the display devices are determined. A cumulative emissions exposure is determined that is based on the light emission profiles for the display devices and the display duration of the display devices for the user. A determination is made whether the cumulative emissions exposure exceeds a light emission exposure limit set for the user. In a positive determination, an instruction is transmitted to the display devices for execution of a remedial action based on pre-defined rules.

In some embodiments, when transmitting the instruction to the one or more display devices for execution of the remedial action, a notification is sent to the user to switch to a display device with a lesser light emission profile. The system may be configured to further determine, after a predefined time period, whether the user has switched to the display device with the lesser light emission profile. In a negative determination, the first display device is shut down for a predefined period of time.

In other embodiments, determining the cumulative emission exposure further includes a determination of content-based emissions exposure to the user based on characteristics of content consumed on the one or more devices by the user. The characteristics of content consumed on the one or more devices by the user may include RGB values of the content consumed.

In yet other embodiments, the light emission exposure limit set for the user is based on user medical information comprising at least one of eyesight prescription, eyesight conditions, and eye aids applied to the user. The user medical information may be received from an Internet-of-Things (IoT) device. In other variants, the light emission exposure limit set for the user is retrieved from a medical database.

The techniques disclosed herein may be used as effective provision of monitoring of light emissions on multiple devices, each having respective light emission profiles.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
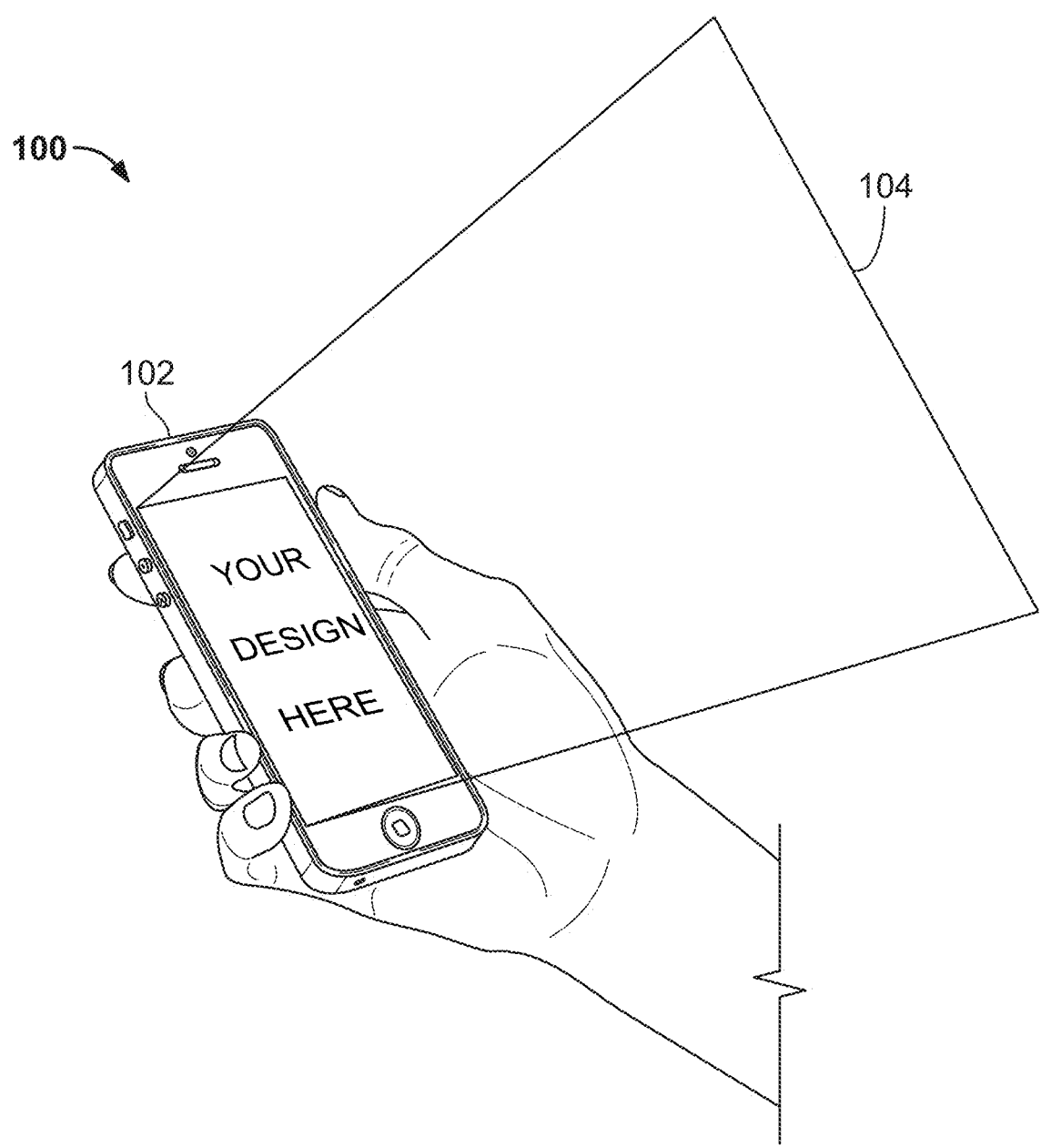
FIG. 1 shows an illustrative diagram of a display device with light emissions, in accordance with some embodiments of the disclosure.

FIG. 1 shows an illustrative diagram 100 of a display device with light emissions, in accordance with some embodiments of the disclosure. In particular, a smartphone device 102 is shown with a light emission 104 protruding outwardly from the display of the device.

A monitoring engine may be implemented to determine the light emissions from various devices. In particular, the monitoring engine may determine a display duration of one or more display devices for a user. For example, the monitoring engine may determine display duration based on engagement with the display device, by measuring user input to the display device. In another embodiment, the monitoring device may determine display duration based on eye-tracking mechanisms using image-capturing hardware (e.g., a front-facing camera) and angle of a user's eye, when the user is using the display device. A cumulative total of user inputs and/or eye tracking may be implemented to determine display duration of a specific user device. This process may be used for multiple display devices. In yet another embodiment, the monitoring engine may receive the display duration from the display device storage keeping a log of the duration of the operations of the display.

The monitoring engine may determine the light emission profiles for each of the one or more display devices. Light emission profiles may be implemented in a variety of techniques disclosed herein. In some embodiments, measures of light emission profiles are implemented by photometric measurements, including, at least, luminous flux (measured in lm), luminous intensity (measured in lm/sr), illuminance (measured in lux), and luminance (measured in lm/m²/sr). Another technique for measuring light emission profiles provides for radiometric measurements including, at least, radiant flux (measured in W), radiant intensity (measured in W/sr), irradiance (W/in²), and radiance (W/in²/sr). Yet another technique for measuring light emissions profiles provides for photonic measurements including, at least, photon flux (measured in moles/s), photon intensity (moles/m²), photon irradiance (moles/m²) and photon radiance (moles/m²/s). In some embodiments, one measure of light emission profile may be the blue light spectrum of the light emission, which includes light emission with wavelengths between the range of 400 nm to 495 nm. In other embodiments, other areas of the light spectrum may be utilized for the light emission profile.

Figure 2:
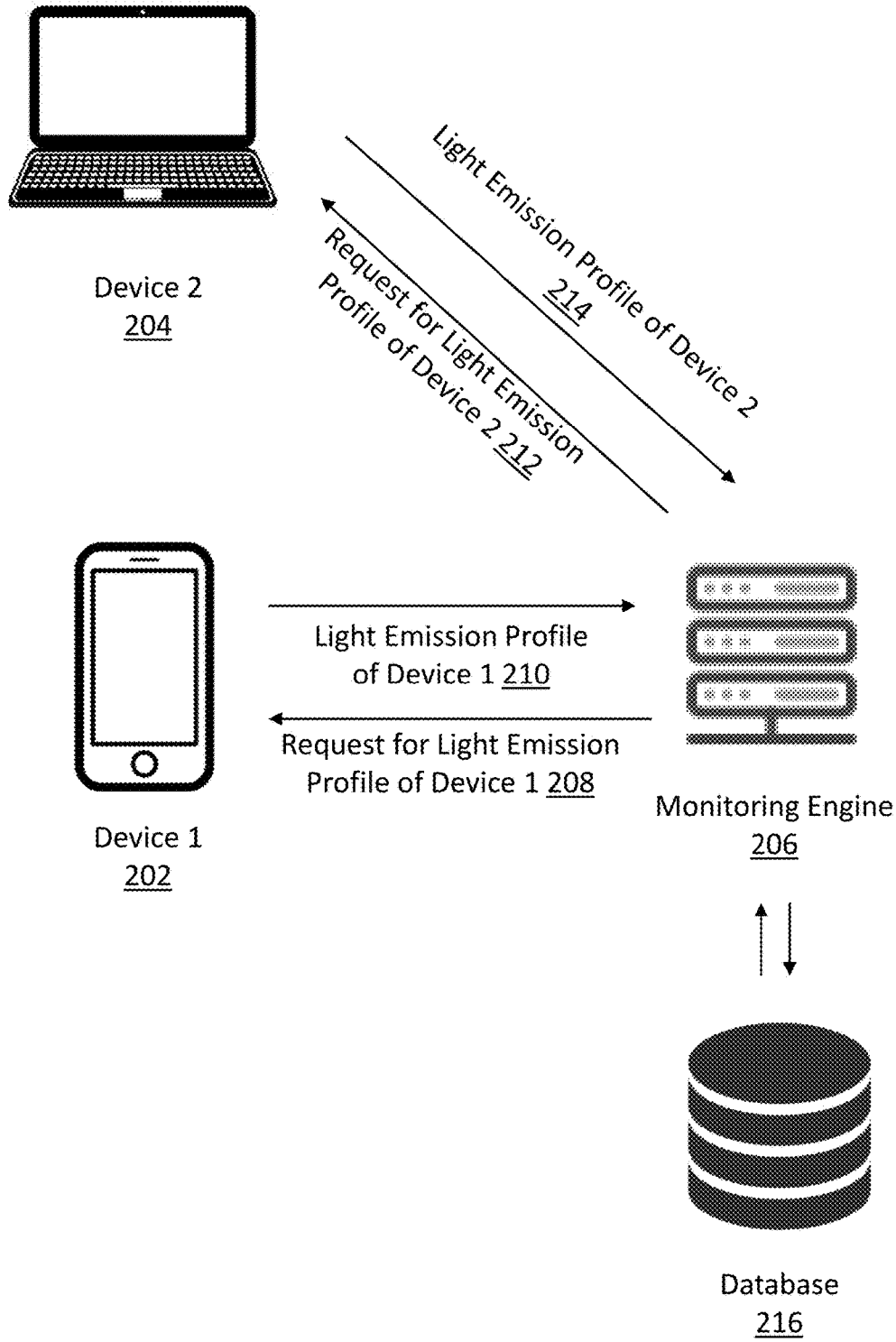
FIG. 2 shows an illustrative diagram of a monitoring engine requesting light emission profiles of multiple display devices, in accordance with some embodiments of the disclosure.

FIG. 2 shows an illustrative diagram 200 of a monitoring engine requesting the light emission profiles of multiple display devices. The monitoring engine 206 may request a light emission profile 208 from a first display device 202, and also request a light emission profile 212 from a second display device 204. The monitoring device may receive the light emission profile from the display devices 210 and 214, respectively. In this technique, the monitoring engine would receive information from each display device regarding specific model information of the display device, and/or information relating to light emission profiles. In other embodiments, the monitoring engine may receive light emission profiles from a database 216, which stores display device information, including light emission profiles for one or more of the display devices and/or information that may be used to generate light emission profiles for one or more of the display devices.

The monitoring engine may determine a cumulative emissions exposure based on the light emission profiles for the one or more display devices and the display duration of the one or more display devices for the user. In one technique, the cumulative emissions exposure may be determined based on a predefined ratio of the light emission profiles to the display durations. In other techniques, a mathematical expression including the light emission profiles and the display durations may be implemented to determine the cumulative emissions exposure.

In some embodiments, the monitoring engine may determine the cumulative emissions exposure by further including content-based emissions exposure to the user based on characteristics of content consumed on the one or more devices by the user. The characteristics of content consumed on the one or more devices by the user may include one or more RGB values of the content consumed. For example, the RGB values of a media asset may be a set of matrices comprising the RGB values for each pixel of a frame of the content being consumed. The monitoring engine may determine various designations of the RGB matrices based on analysis of the RGB matrices (e.g., a determination that the matrices are predominately blue light for an extended duration). These designations (e.g., "predominately blue light") may be implemented to determine the cumulative emissions exposure. Alternatively, the RGB values of the matrices may be used in a mathematical expression including the light emission profiles and the display durations to determine the cumulative emissions exposure. In other embodiments, the monitoring engine may receive media asset information from the media server for a specific user profile. The media asset information may include media assets viewed by the user, the duration of each of the media assets, the duration of the media assets watched, and/or related media asset information derived from metadata of the media asset or user profile on the media server. This content-based emissions exposure may be used in a mathematical expression including the light emission profiles and the display durations to determine the cumulative emissions exposure.

The monitoring engine may determine whether the cumulative emissions exposure exceeds a light emission exposure limit set for the user. The light emission exposure limit set for the user may be determined by a number of techniques disclosed herein. In some embodiments, the light emission exposure limit set for the user is a predetermined value retrieved from a database and/or the display device. In other embodiments, the light emission exposure limit set for the user is set by user instruction of a display device.

In yet other embodiments, the light emission exposure limit set for the user is based on user medical information comprising at least one of eyesight prescription, eyesight conditions, and eye aids applied to the user. The monitoring engine may retrieve the user medical information from a medical database for a user associated with a display device. In some embodiments, the monitoring engine may receive the user medical information from an Internet-of-Things (IoT) device. For example, the monitoring engine may retrieve the user medical information from a smartwatch that monitors medical analytics such as heartrate, pulse, perspiration rate, blink rate, eye angle, etc. In some embodiments, the light emission exposure limit set for the user is set by instruction received from a device interfacing with a medical database (e.g., a medical service professional may utilize a network-enabled electronic device to send a light emission exposure limit to the monitoring engine).

The monitoring engine may, in response to the determination that the cumulative emissions exposure exceeds the light emission exposure limit set for the user, transmit an instruction to the one or more display devices for execution of a remedial action, based on one or more predefined rules. In some embodiments, the remedial action includes shutting down the one or more display devices for a predefined time period. In other embodiments, the remedial action includes transmitting a notification to the user to switch to a display device of the one or more display devices with a lesser light emission profile. For example, this may include a message "Please switch from your mobile phone to your tablet or PC device within 5 minutes." In some embodiments, the monitoring engine may determine after a predefined time period, whether the user has switched to the display device of the one or more display devices with the lesser light emission profile. In response to the determination that, after the predefined time period, the user has not switched to the display device of the one or more display devices with the lesser light emission profile, the monitoring engine may shut down the one or more display devices for a predefined period of time. Other remedial actions may be implemented that cause altering of operations of one or more of the display devices.

Figure 3:
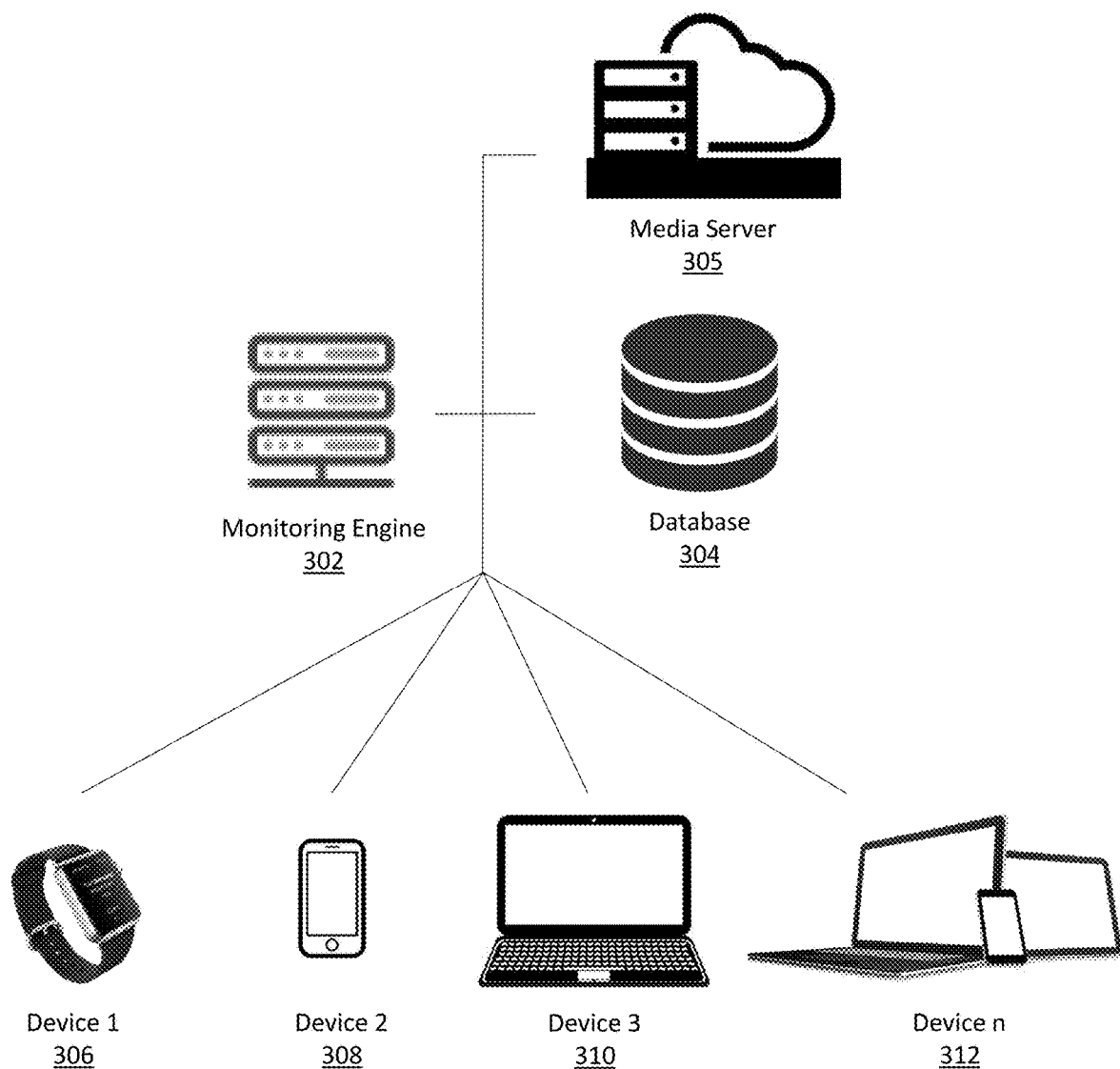
FIG. 3 shows an illustrative system diagram of the monitoring engine, database, media server, and electronic devices, in accordance with some embodiments of the disclosure.
Figure 4:
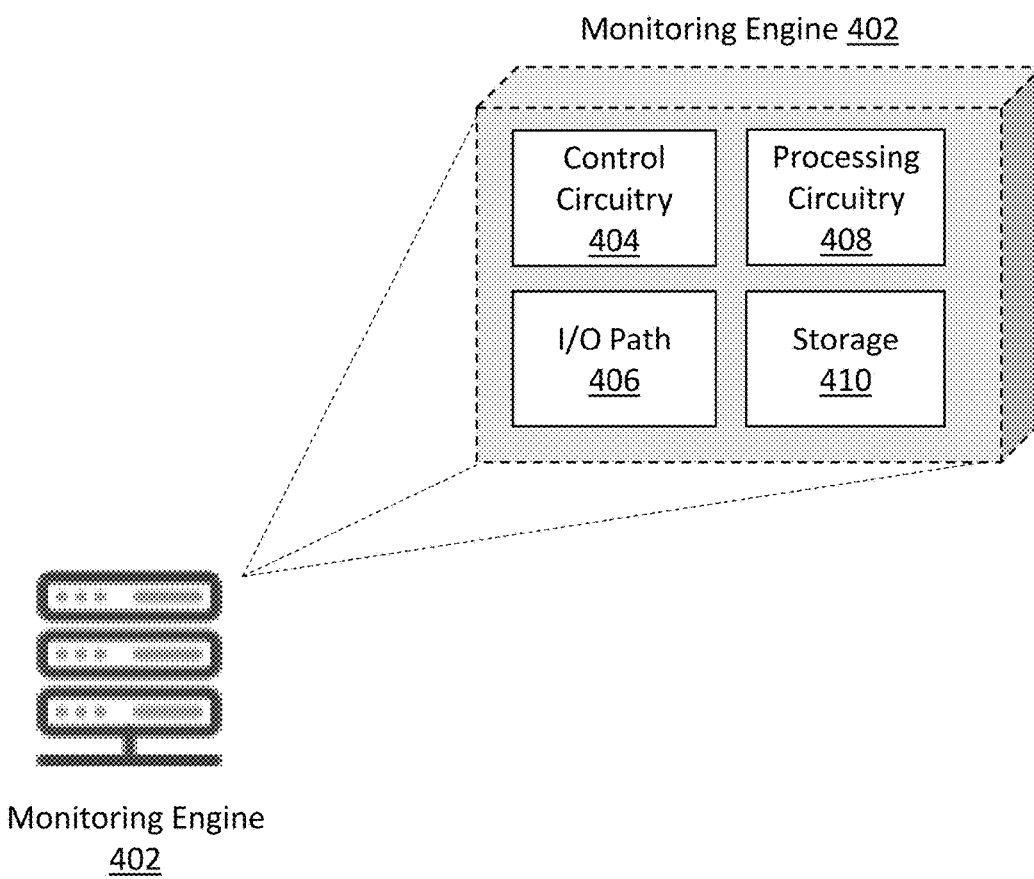
FIG. 4 shows an illustrative block diagram of the monitoring engine, in accordance with some embodiments of the disclosure.

FIG. 3 shows an illustrative system diagram 300 of the monitoring engine, database, media server, and electronic devices, in accordance with some embodiments of the disclosure. The monitoring engine 302 may be of any hardware that provides for processing and transmit/receive functionality. The monitoring engine may be communicatively coupled to multiple electronic devices (e.g., device 1 (306), device 2 (308), device 3 (310), and device n (312)), a database 304, and a media server 305. A further detailed disclosure on the monitoring engine can be seen in FIG. 4 showing an illustrative block diagram of the monitoring engine, in accordance with some embodiments of the disclosure.

In some embodiments, the monitoring engine may be implemented remote from the devices 306-312 such as from a cloud server configuration. The monitoring engine may be implemented through embedded processing circuitry within devices 306-312 (e.g., processors in smartphones). The monitoring engine may include processing circuitry in a smartphone, a smartwatch, a smart wearable device, a Smart TV, a set-top box, an integrated receiver decoder (IRD) for handling satellite television, a digital storage device, a digital media receiver (DMR), a digital media adapter (DMA), a streaming media device, a local data structure, a BLU-RAY player, a BLU-RAY recorder, a personal computer (PC), a smart-home personal assistant, a laptop computer, a tablet computer, a WebTV box, a personal computer television (PC/TV), a PC data structure, a PC media center, a handheld computer, a personal digital assistant (PDA), a mobile telephone, a portable video player, a portable music player, a portable gaming machine, or any other television equipment, computing equipment, Internet-of-Things device, wearable device, or wireless device, and/or combination of the same. Any of the system modules (e.g., monitoring engine, database, media server, and electronic devices) may be any combination of shared or disparate hardware pieces that are communicatively coupled.

In some embodiments, the database may be implemented remote from the electronic devices 306-312, and the monitoring engine 302 such as a cloud server configuration. The database may be any device interfacing with the monitoring engine for provision of device related information (e.g., device identifiers, light emission profiles) and/or medical related information of a user profile (e.g., information related to eyesight prescription, eyesight conditions, and eye aids applied to user). In some embodiments, the database provides the media assets via streaming format over a communication network (e.g., Internet, Bluetooth, NFC, auxiliary cord, USB interface, or similar). In some embodiments, the database provides permissions for a user account to access media assets on local storage. The database may be implemented by remote servers, remote databases, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local data structure, a BLU-RAY player, a BLU-RAY recorder, a personal computer (PC), a laptop computer, a tablet computer, a personal computer television (PC/TV), a PC data structure, a PC media center, a handheld computer, a personal digital assistant (PDA), a mobile telephone, a portable video player, a portable music player, a portable gaming machine, or any other television equipment, computing equipment, Internet-of-Things device, wearable device, or wireless device, and/or combination of the same.

In some embodiments, the media server 305 may be implemented remote from the electronic devices 306-312, database 304 and the monitoring engine 302 such as a cloud server configuration. The media server may be any device interfacing with the monitoring engine for provision of media asset information (e.g., metadata of media assets, content consumed by a particular user profile (in real-time and/or historical)). In some embodiments, the media server provides the information over a communication network (e.g., Internet, Bluetooth, NFC, auxiliary cord, USB interface, internal system bus, internal circuitry, or similar). The media server may be implemented by a vehicle infotainment system, a vehicle entertainment system, a vehicle navigation system, a stand-alone navigation system, a smartphone, a smartwatch, a digital storage device, a digital media receiver (DMR), a digital media adapter (DMA), a streaming media device, a personal computer (PC), a laptop computer, a tablet computer, a personal computer television (PC/TV), a PC data structure, a PC media center, a handheld computer, a personal digital assistant (PDA), a portable video player, a portable music player, a portable gaming machine, or any other entertainment equipment, computing equipment, Internet-of-Things device, wearable device, or wireless device, and/or combination of the same.

In some embodiments, the monitoring engine, database, media server, and a device from devices 306-312 may be implemented within a single local device. In other embodiments, the monitoring engine and streaming service server may be implemented within a single local device.

The electronic devices (e.g., device 1 (306), device 2 (308), device 3 (310), and device n (312)), may be any device that has properties to display content. The devices 306-312 may be implemented by a vehicle infotainment system, vehicle entertainment system, a vehicle navigation system, a smartphone, a smartwatch, a smart wearable device, a Smart TV, a streaming media device, a personal computer (PC), a smart-home personal assistant, a laptop computer, a tablet computer, a WebTV box, a personal computer television (PC/TV), a PC media center, a handheld computer, a personal digital assistant (PDA), a mobile telephone, a portable video player, a portable music player, a portable gaming machine, or any other television equipment, computing equipment, Internet-of-Things device, wearable device, or wireless device, and/or combination of the same with display capabilities.

FIG. 4 shows an illustrative block diagram 400 of the monitoring engine, in accordance with some embodiments of the disclosure. In some embodiments, the monitoring engine may be communicatively connected to a user interface. In some embodiments, the monitoring engine may include processing circuitry, control circuitry, and storage (e.g., RAM, ROM, hard disk, removable disk, etc.). The monitoring engine may include an input/output path 406. I/O path 406 may provide device information, or other data, over a local area network (LAN) or wide area network (WAN), and/or other content and data to control circuitry 404, that includes processing circuitry 408 and storage 410. Control circuitry 404 may be used to send and receive commands, requests, signals (digital and analog), and other suitable data using I/O path 406. I/O path 406 may connect control circuitry 404 (and specifically processing circuitry 408) to one or more communications paths.

Control circuitry 404 may be based on any suitable processing circuitry such as processing circuitry 408. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g. two Intel Core i7 processors) or multiple different processors (e.g., an Intel Core i5 processor and an Intel Core i7 processor). In some embodiments, control circuitry 404 executes instructions for a monitoring engine stored in memory (e.g., storage 410).

Memory may be an electronic storage device provided as storage 410, which is part of control circuitry 404. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

The monitoring engine 402 may be coupled to a communications network. The communication network may be one or more networks including the Internet, a mobile phone network, mobile voice or data network (e.g., a 5G, 4G or LTE network), mesh network, peer-to-peer network, cable network, or other types of communications network or combinations of communications networks. The monitoring engine may be coupled to a secondary communication network (e.g., Bluetooth, Near Field Communication, service provider proprietary networks, or wired connection) to the selected device for generation for playback. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

Figure 5:
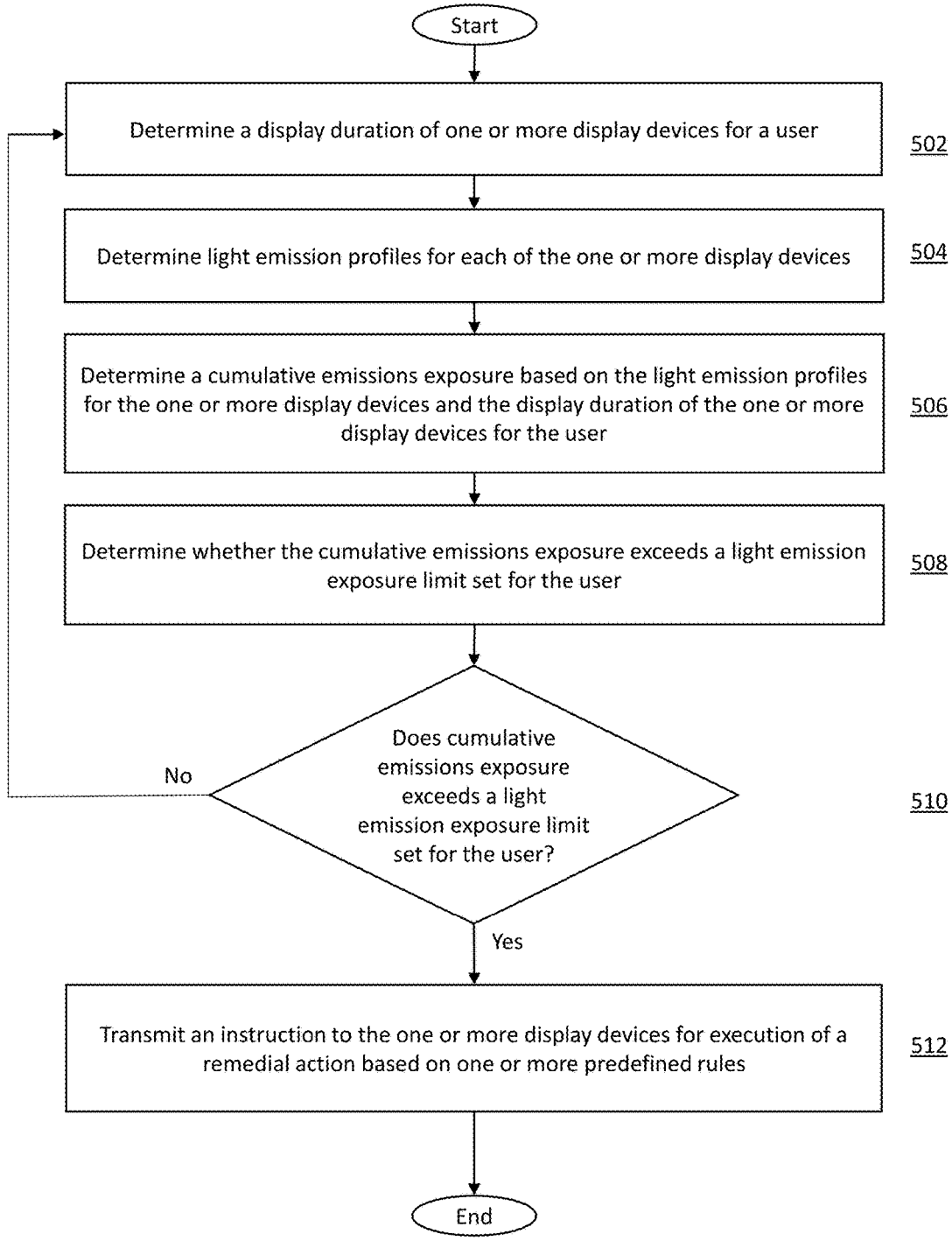
FIG. 5 is an illustrative flowchart of a process for monitoring light emissions in electronic devices, in accordance with some embodiments of the disclosure.

FIG. 5 is an illustrative flowchart of a process for monitoring light emissions in electronic devices, in accordance with some embodiments of the disclosure. Process 500, and any of the following processes, may be executed by control circuitry 404 (e.g., in a manner instructed to control circuitry 404 by the monitoring engine 402). Control circuitry 404 may be part of a monitoring engine, or of a remote server separated from the monitoring engine by way of a communication network, or distributed over a combination of both.

At 502, the monitoring engine 402, by control circuitry 404, determines a display duration of one or more display devices for a user. In some embodiments, the monitoring engine receives data from the devices 306-312 via the I/O path 406 regarding the duration of display of the respective device. In other embodiments, the monitoring engine receives data from the media server 305 via the I/O path 406 regarding the duration of content consumed from media asset metadata on the media server. In some embodiments, the determination of the display duration of one or more display devices for a user is performed, at least in part, by processing circuitry 408.

At 504, the monitoring engine 402, by control circuitry 404, determines light emission profiles for each of the one or more display devices. In some embodiments, the monitoring engine receives the light emission profiles from the devices 306-312 via the I/O path 406. In other embodiments, the monitoring engine receives the light emission profiles from the media server 305 via the I/O path 406 through storage of device emission profiles in the media server. In some embodiments, the determination of light emission profiles for each of the one or more display devices is performed, at least in part, by processing circuitry 408.

At 506, the monitoring engine 402, by control circuitry 404, determines a cumulative emissions exposure based on the light emission profiles for the one or more display devices and the display duration of the one or more display devices for the user. In some embodiments, the determination of the cumulative emissions exposure is performed, at least in part, by processing circuitry 408.

At 508, the monitoring engine 402, by control circuitry 404, determines whether the cumulative emissions exposure exceeds a light emission exposure limit set for the user. In some embodiments, the determination of the cumulative emissions exposure is performed, at least in part, by processing circuitry 408. If, at 510, control circuitry determines "No," the cumulative emissions exposure does not exceed the light emission exposure limit set for the user, the process reverts to 502. In some embodiments, the monitoring engine 302 receives medical information of a user from the database 304 via the I/O path 406. The control circuitry 404 may determine a light emission exposure limit set for the user based on the received medical information from the database.

If, at 510, the control circuitry determines "Yes," the cumulative emissions exposure exceeds the light emission exposure limit set for the user, the process advances to 512. At 512, the monitoring engine 402, by control circuitry 404, transmits an instruction to the one or more display devices for execution of a remedial action based on one or more predefined rules. In some embodiments, the monitoring engine 304 transmits the instruction to the devices 306-312 via the I/O path 406.

Figure 6:
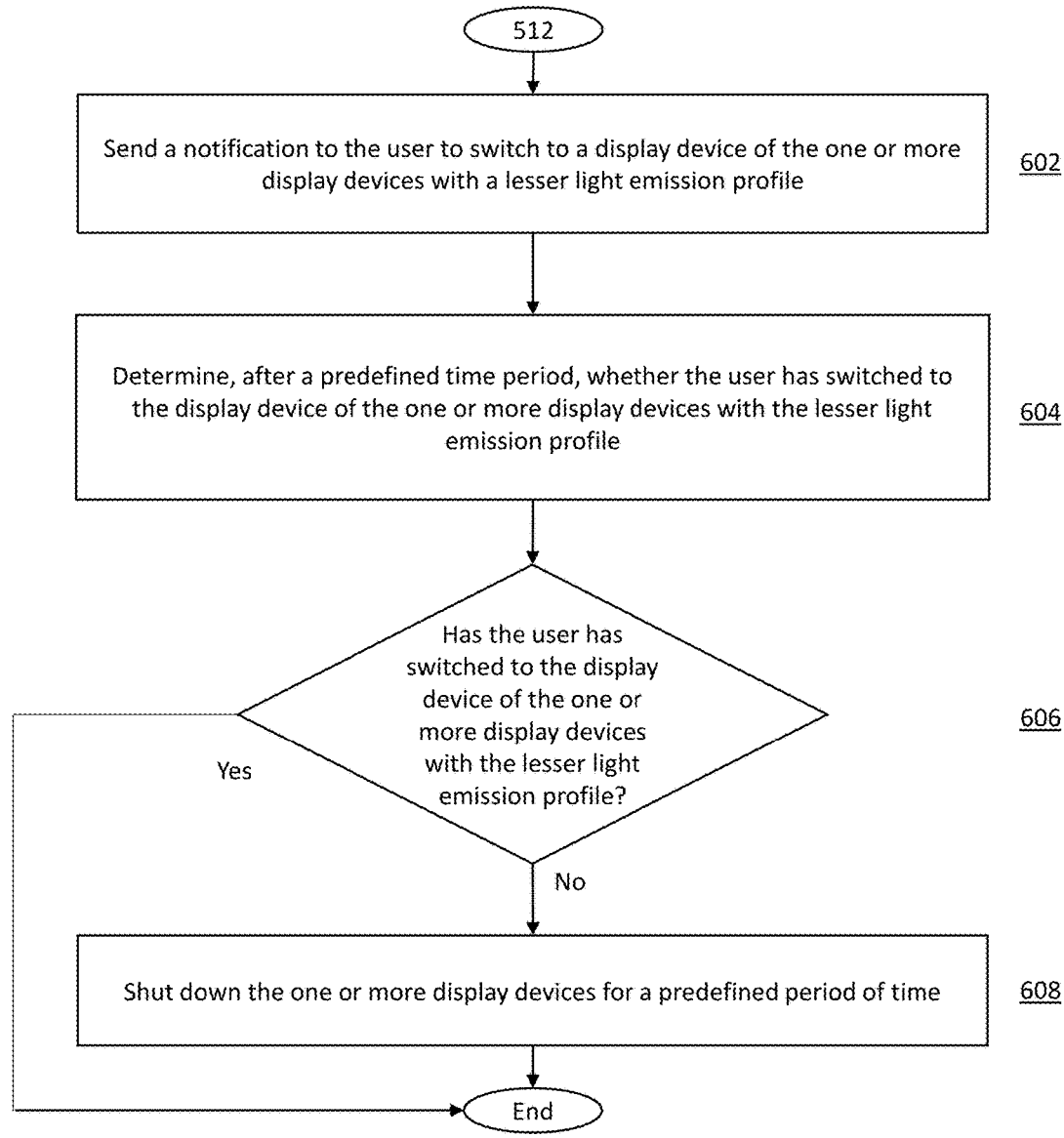
FIG. 6 is an illustrative flowchart of a process for transmitting instructions to display devices for execution of remedial actions, in accordance with some embodiments of the disclosure.

FIG. 6 is an illustrative flowchart of a process 600 for transmitting instructions to display devices for execution of remedial actions, in accordance with some embodiments of the disclosure. At 602, the monitoring engine 402, by control circuitry 404, transmits a notification to the user to switch to a display device of the one or more display devices with a lesser light emission profile. In some embodiments, the monitoring engine 302 transmits a notification to the devices 306-312 via the I/O path 406.

At 604, the monitoring engine 402, by control circuitry 404, determines, after a predefined time period, whether the user has switched to the display device of the one or more display devices with the lesser light emission profile. In some embodiments, the monitoring engine 302 receives data from the devices 306-312 via the I/O path 406 regarding the status of their operation (powered on/off, logged in/off). If, at 606, control circuitry determines "No," the user has not switched to the display device of the one or more display devices with the lesser light emission profile, the process advances to END.

If, at 606, control circuitry determines "Yes," the user has switched to the display device of the one or more display devices with the lesser light emission profile, the process advances to 608. At 608, the monitoring engine 402, by control circuitry 404, shuts down the one or more display devices for a predefined period of time. In some embodiments, the monitoring engine 402, by control circuitry 404, sends a shut-down instruction via the I/O path 406 to the corresponding device of the devices 306-312.

It is contemplated that some suitable steps or suitable descriptions of FIGS. 5-6 may be used with other suitable embodiment of this disclosure. In addition, some suitable steps and descriptions described in relation to FIGS. 5-6 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 3-4 could be used to perform one or more of the steps in FIGS. 5-6.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   tracking a user's eye angle to determine a time duration when a display of an electronic device is within the eye angle;
   determining a light emission exposure count based on the time duration;
   comparing the light emission exposure count to a light emission exposure limit; and
   in response to determining that the light emission exposure count exceeds the light emission exposure limit, executing an instruction for the electronic device to execute a remedial action,
   wherein the remedial action is an instruction to switch to a second display device of the user.

2. The method of claim 1, further comprising activating a front-facing camera of the display device, wherein the front-facing camera tracks the angle of the user's eye with respect to a display screen of the electronic device.

3. The method of claim 1, further comprising monitoring the eye blink rate of the user through an electronic device.

4. The method of claim 3, wherein the angle of the user's eye and the eye blink rate are used for determining the light emission exposure count.

5. The method of claim 3, wherein the electronic device is a smart watch.

6. The method of claim 1, further comprising:
   receiving an instruction from an electronic device interfacing with a medical database; and
   determining the light emission exposure limit based on the received instruction.

7. The method of claim 6, wherein received instruction include medical information relating to the user comprising at least one of eyesight prescription, eyesight conditions, and eye aids applied to the user.

8. The method of claim 1, wherein the remedial action provides a predetermined time limit for switching to the second display device of a user.

9. The method of claim 1, wherein the remedial action shuts down the electronic device of the user if a determination is made that the user has not switched to the second device within the predetermined time limit.

10. A system, comprising:
    communication circuitry configured to access an electronic device of a user; and
    control circuitry configured to:
       track the user's eye angle to determine a time duration when a display of the electronic device is within the eye angle;
       determine a light emission exposure count based on the time duration;
       compare the light emission exposure count to a light emission exposure limit; and
       in response to determining that the light emission exposure count exceeds the light emission exposure limit, execute an instruction for the electronic device to execute a remedial action,
    wherein the remedial action is an instruction from the control circuitry to switch to a second display device of the user.

11. The system of claim 10, further comprising, the control circuitry configured to activate a front-facing camera of the display device, wherein the front-facing camera tracks the angle of the user's eye with respect to a display screen of the electronic device.

12. The system of claim 10, further comprising, the control circuitry configured to monitor the eye blink rate of the user through an electronic device.

13. The system of claim 12, wherein the angle of the user's eye and the eye blink rate are used by the control circuitry to determine the light emission exposure count.

14. The system of claim 12, wherein the electronic device is a smart watch.

15. The system of claim 10, further comprising, the control circuitry configured to:
    receive an instruction from an electronic device interfacing with a medical database; and
    determine the light emission exposure limit based on the received instruction.

16. The system of claim 15, wherein, received instruction include medical information relating to the user comprising at least one of eyesight prescription, eyesight conditions, and eye aids applied to the user.

17. The system of claim 10, wherein the remedial action configures provides a predetermined time limit for switching to the second display device of a user.

18. The system of claim 10, wherein the remedial action shuts down the electronic device of the user if a determination is made that the user has not switched to the second device within the predetermined time limit.

* * * * *